United States Patent
Hsu et al.

(10) Patent No.: US 7,203,995 B2
(45) Date of Patent: Apr. 17, 2007

(54) ROTARY TYPE HINGE ASSEMBLY FOR FOLDABLE ELECTRONIC DEVICE

(75) Inventors: Sheng-Cheng Hsu, Tu-Cheng (TW); Shi-Hua Tian, Shenzhen (CN); Xiang-Dong Chen, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 130 days.

(21) Appl. No.: 10/949,494

(22) Filed: Sep. 24, 2004

(65) Prior Publication Data

US 2005/0066474 A1   Mar. 31, 2005

(30) Foreign Application Priority Data

Sep. 26, 2003   (TW) .............................. 92217354 U

(51) Int. Cl.
*E05D 11/10* (2006.01)
(52) U.S. Cl. .............................. 16/330; 16/367; 16/303
(58) Field of Classification Search .................. 16/330, 16/303, 367, 911; 361/680–683; 455/575.1, 455/575.4, 575.8, 550.1; 379/433.12, 433.13; 248/919–923; 348/373, 333.06
See application file for complete search history.

(56) References Cited

U.S. PATENT DOCUMENTS 6,633,643 B1 *  10/2003  Ona ....................... 379/433.13
6,920,668 B2 *   7/2005  Hayashi ....................... 16/303
2001/0053674 A1 * 12/2001  Katoh .......................... 455/90
2004/0110529 A1 *  6/2004  Watanabe et al. ......... 455/550.1
2004/0141287 A1 *  7/2004  Kim et al. ................... 361/683

(Continued)

FOREIGN PATENT DOCUMENTS

| EP | 1288414 A1 | | 3/2003 |
|---|---|---|---|
| GB | 2300881 A | * | 11/1996 |
| JP | 2000017932 A | * | 1/2000 |
| JP | 2002155923 A | * | 5/2002 |
| JP | 2004204978 A | * | 7/2004 |
| KR | 2003094474 A | * | 12/2003 |

*Primary Examiner*—Chuck Y. Mah
(74) *Attorney, Agent, or Firm*—Morris Manning & Martin LLP; Tim Tingkang Xia, Esq.

(57) ABSTRACT

A rotary type hinge assembly for joining a body (310) and a cover (320) of a foldable electronic device has a first axis (A1) and a second axis (A2), and enables the cover open about the first axis and rotate about the second axis. The hinge assembly includes: a housing (210), rotatably attached to the body, and defining a container therein; a spring (220) received in the container; a driven element (230), wherein a first end thereof supports the spring, and a second end thereof has a cam surface (232); a cam (240), being coaxial with the driven element, a cam surface (243) defined on an end thereof including a mountain-shaped portion (244) having a flat surface engaging with the cam surface of the driven element; a rotary shaft (250); and a fixing means (260) for fixing the rotary shaft in the cover; wherein the rotary shaft extend through the cam, the driven element and the spring in that order, and is fixed in the housing.

19 Claims, 9 Drawing Sheets

U.S. PATENT DOCUMENTS

| | | | |
|---|---|---|---|
| 2004/0200038 A1* | 10/2004 | Kim | 16/367 |
| 2004/0244147 A1* | 12/2004 | Qin et al. | 16/330 |
| 2005/0050683 A1* | 3/2005 | Tonogai | 16/305 |
| 2005/0050687 A1* | 3/2005 | Shiba | 16/367 |
| 2005/0055806 A1* | 3/2005 | Shiba | 16/341 |
| 2005/0138771 A1* | 6/2005 | Su | 16/330 |
| 2005/0150081 A1* | 7/2005 | Gan | 16/367 |
| 2005/0198779 A1* | 9/2005 | Jung et al. | 16/367 |

* cited by examiner

ROTARY TYPE HINGE ASSEMBLY FOR FOLDABLE ELECTRONIC DEVICE

BACKGROUND OF THE INVENTION

1. Field of the Invention

The present invention relates to hinge assemblies used in foldable electronic devices, and particularly to a rotary type hinge assembly which enables a cover of a foldable electronic device to rotate while the rotary type hinge assembly is rotated with respect to a body of the foldable electronic device.

2. Prior Art

Portable electronic devices, such as mobile phones and PDAs (personal digital assistants), are becoming ever more popular along with the ongoing development of wireless communication technology and data processing technology. A large number of consumers favor a folder-type portable electronic device for its novelty, convenience and aesthetic appeal. The folder-type portable electronic device generally includes a cover, a body, and a hinge assembly rotatably interconnecting the cover and the body so that the cover can open or closed with respect to the body. The hinge assembly can generate a force, which acts on the cover in a direction which enables the cover to be fully opened when the cover has been manually rotated further than a predetermined angle. The hinge assembly can also generate a force which acts on the cover in a direction which forces the cover to be in tight contact with the body when the cover has been manually rotated less than a predetermined angle.

As mobile communication services gradually become more and more diversified, the functions of portable electronic devices are also rapidly diversifying. However, the conventional hinge assembly has the function of opening and closing the cover only along a single arcuate path with respect to the body. This limits the range of configurations that the portable electronic device may have. For example, additional devices can be added to the portable electronic device in only a limited number of locations. In another example, where a mobile phone includes a digital camera, the ability to take photos at various orientations of the mobile phone is limited. The hinge assembly cannot readily satisfy consumer preferences, and runs against the current trend toward providing various extra mobile communication services in portable electronic devices.

Recent inventions have attempted to solve the above-mentioned problems of the conventional hinge assembly.

For example, European patent application No. EP 1288414 A1, published under the name of inventors Kang, Sung-III et al and entitled "Rotary type hinge for portable wireless terminal" discloses a rotary type hinge assembly. This hinge assembly is represented in FIG. 9. The hinge assembly 100 includes a hinge body 110, a supporting shaft 130, a rotary shaft 170, a hinge cam 150, a driven element 160, and an elastic means 169. The hinge cam 150, the driven element 160 and the elastic means 169 are assembled with the supporting shaft 130 in that order, and received in the rotary shaft 170. The hinge body 110 has a holding pin hole 119a defined though one end thereof, and a hinge shaft hole (not shown) defined though the other end thereof. The hinge body 110 is rotatably assembled with the body of the portable electronic device at the holing pin hole 119a and the hinge shaft hole. The hinge body 110 includes a fixing seat 113a and an opening 111. The fixing seat 113a is formed at a middle portion of the hinge body 110, and the opening 111 is defined in the middle portion opposite from the fixing seat 113a. The supporting shaft 130 is fixed to the fixing seat 113a, and extends though the opening 111. The supporting shaft 130 has a step portion 133 and an annular groove 135. The supporting shaft 130 is received in the rotary shaft 170, and protrudes out through a shaft hole 173b so that the annular groove 135 is exposed. A fixing ring 181 is fitted in the annular groove 135. In particular, a washer 183 is fitted between the fixing ring 181 and the annular groove 135. The hinge cam 150 snugly receives the step portion 133, in order to be fixed on the supporting shaft 130. The hinge cam 150 has two distant valley-shaped portions 151 formed at one end thereof, and a curved surface formed between the valley-shaped portions 151. The driven element 160 is rotatably attached to the supporting shaft 130, and includes a mountain-shaped portion 161. The mountain-shaped portion 161 and the valley-shaped portion 151 are in sliding contact with each other.

This kind of rotary type hinge assembly enables the cover of the portable electronic device to rotate when the cover is flipped open with respect to the body of the portable electronic device. However, when the rotary shaft 170 rotates in order to drive the cover to rotate in unison, a thrust force is generated, which acts directly on the supporting shaft 130 at the annular groove 135. After repeated use, the supporting shaft 130 at the annular groove 135 is liable to fatigue and fracture. Additionally, the fixing ring 181 may loosen over time and make the mechanism unreliable. Furthermore, the engagement of the hinge cam 150 and the driven element 160 is such that the hinge assembly 100 can be stably located only at particular discrete angles such as 90 degrees or 180 degrees. When the cover has a display screen, he hinge assembly 100 does not allow the user to conveniently look at the screen from various different angles. Moreover, the configuration of the hinge assembly 100 is complicated, and it occupies a comparatively large volume.

Thus, a need exists for a new rotary type hinge assembly which overcomes the above-described shortcomings.

SUMMARY OF THE INVENTION

An object of the present invention is to provide a rotary type hinge assembly for a foldable electronic device which enables a cover of the foldable electronic device to be rotated and securely located at a variety of different angles when the cover is flipped open relative to a body of the foldable electronic device.

Another object of the present invention is to provide a rotary type hinge assembly which is highly reliable, has a simple configuration, and occupies a relatively small volume.

To accomplish the above-mentioned objects, the present invention provides a rotary type hinge assembly for joining a body and a cover of a foldable electronic device, the hinge assembly defining a first axis and a second axis perpendicular to the first axis, the hinge assembly enabling the cover to open with respect to the body about the first axis and rotate about the second axis, and the hinge assembly including: a housing rotatably attached to the body of the foldable electronic device, and defining a container therein; a first elastic means received in the container of the housing; a first driven element, a first end thereof supporting the first elastic means, and a second end thereof having a cam surface; a first cam being coaxial with the first driven element, and having a cam surface defined on an end thereof, the cam surface including a mountain-shaped portion having a flat surface engaging with the cam surface of the first driven element; a rotary shaft; and a fixing means for fixing the rotary shaft in the cover; wherein the rotary shaft extends through the first cam, the first driven element and the first elastic means in that order, and is fixed in the housing.

The rotary type hinge assembly of the present invention enables one end of the hinge shaft assemble tightly with the cover of the foldable electronic device by the fixing means, so that the hinge shaft can rotate with the cover. Since the housing is comparatively thick, the mechanism capability of the housing is better than the mechanism capability of the cover. Since the other end of the hinge shaft is fixed by the fixing clip, the reliability is better. Moreover the driven element and the cam of the rotary type hinge assembly enables the rotary type hinge assembly locate at any position when the cover is opened with respect to the body. Furthermore, the rotary type hinge assembly of the present invention cuts down some unnecessary elements of the prior art, so that the rotary type hinge assembly has a simple configuration and a small volume.

Other objects, advantages and novel features of the invention will be drawn from the following detailed description with reference to the attached drawings, in which:

DETAILED DESCRIPTION OF THE PREFERRED EMBODIMENT

Figure 1:
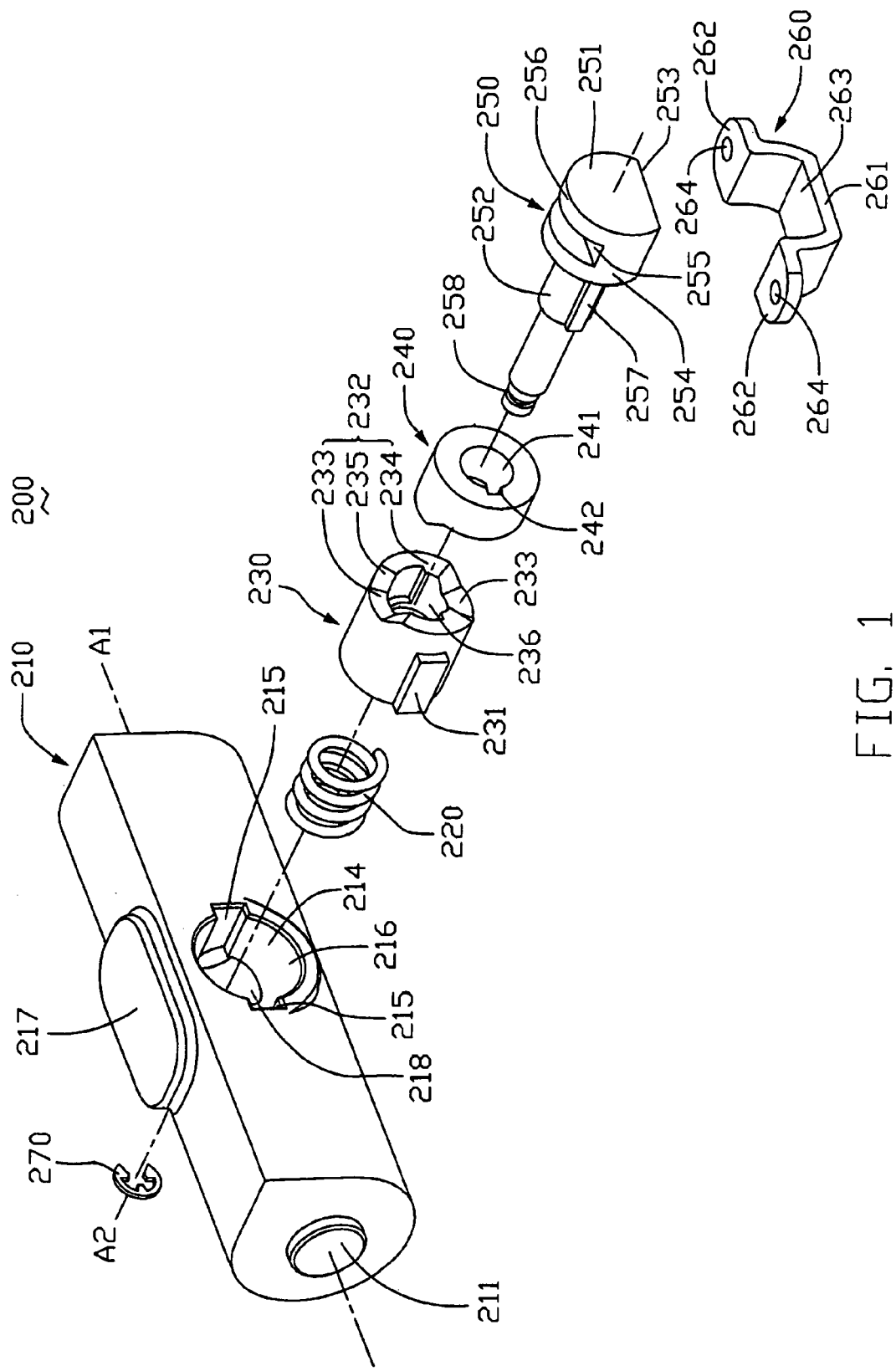
FIG. 1 is an exploded, isometric view of a rotary type hinge assembly for a mobile phone in accordance with the present invention, the rotary type hinge assembly including a rotary hinge assembly and a folder-opening hinge assembly (not visible) sharing a common housing.
Figure 2:
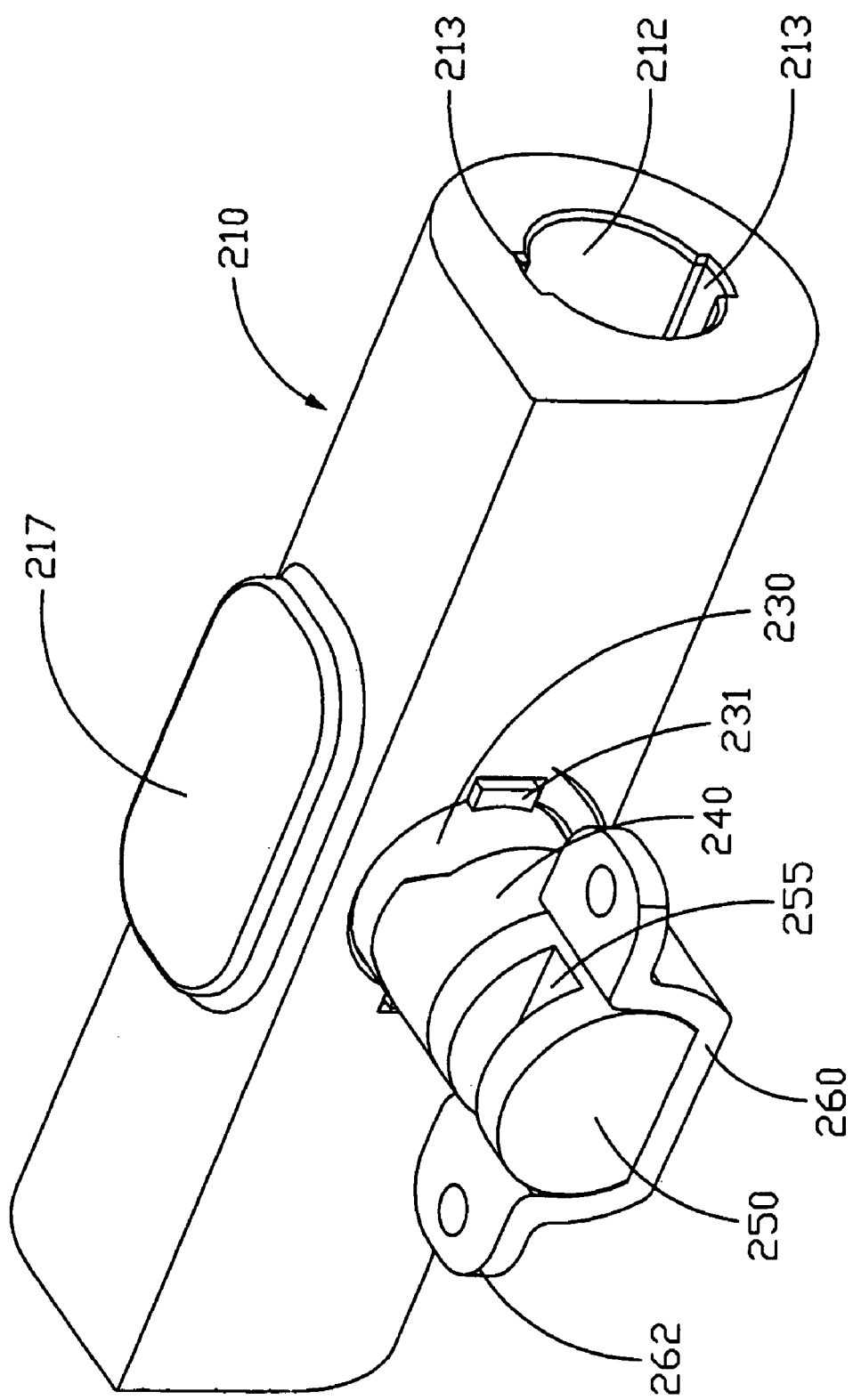
FIG. 2 is an assembled view of FIG. 1, but viewed from another aspect, and not showing components of the folder-opening hinge assembly.

An exemplary embodiment of a rotary type hinge assembly in accordance with the present invention includes a rotary hinge assembly 200 and a folder-opening hinge assembly 400. Referring to FIGS. 1 and 2, the rotary hinge assembly 200 includes a hollow housing 210, a helical spring 220, a driven element 230, a cam 240, a rotary shaft 250, an anti-pressure board 260, and an E-shaped fixing clip 270. The cam 240, the driven element 230, the spring 220 and the fixing clip 270 are assembled with the rotary shaft 250 in that order, the spring 220 and the driven element 230 are received in the housing 210 in that order, and the anti-pressure board 260 is fixed on the rotary shaft 250.

Figure 4:
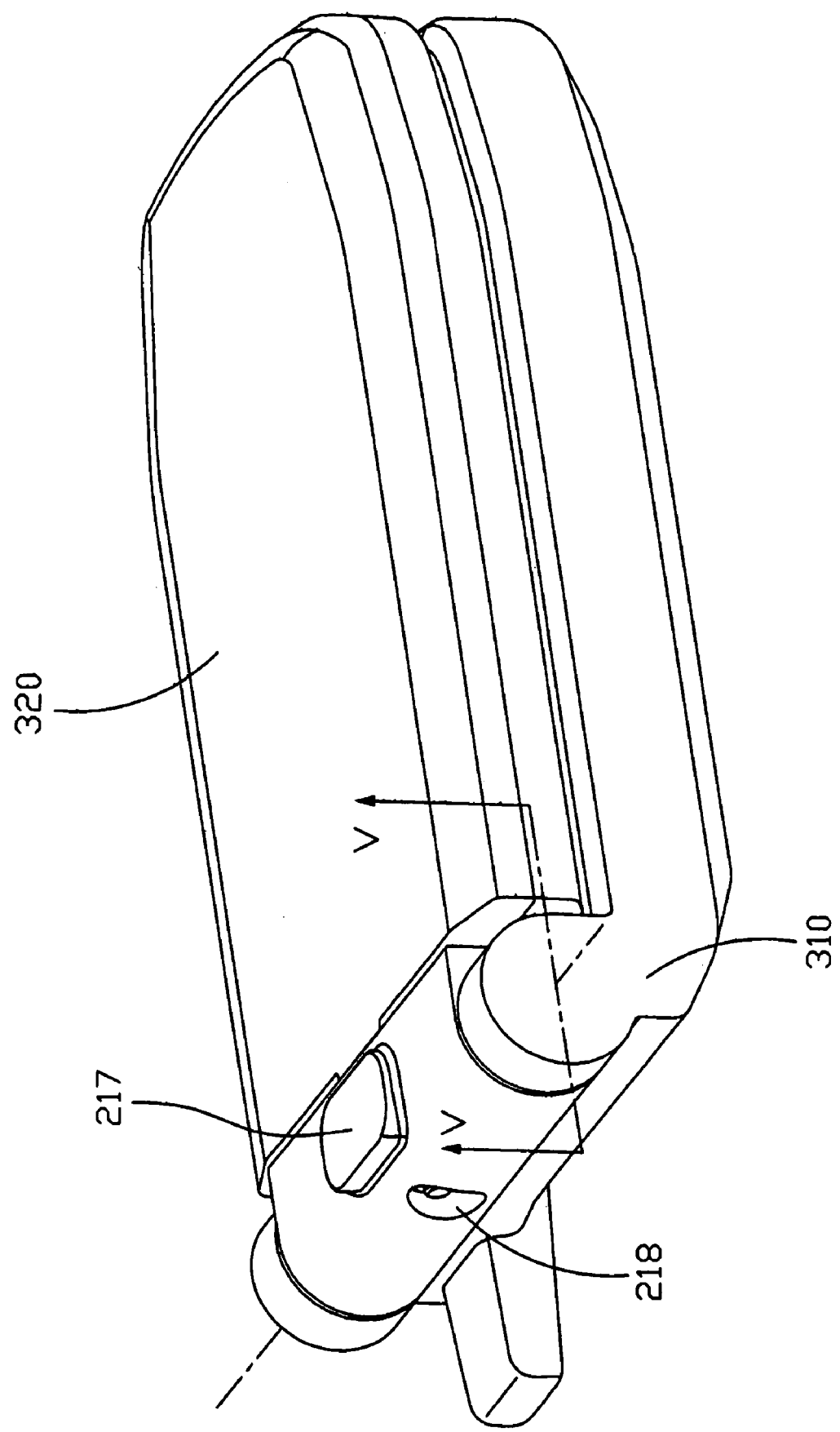
FIG. 4 is an isometric view of a mobile phone incorporating the rotary type hinge assembly of FIG. 1.
Figure 5:
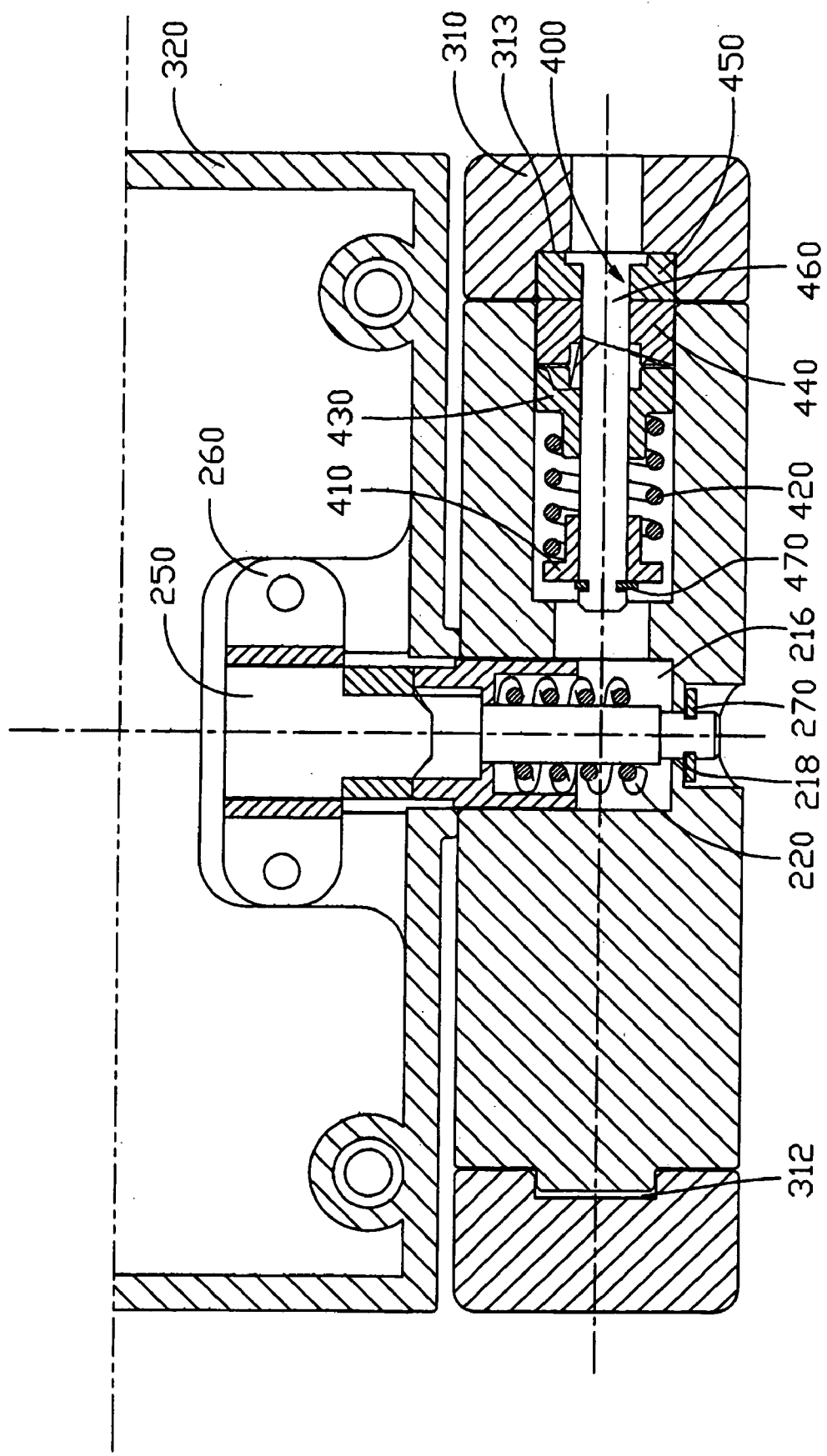
FIG. 5 is a cross-sectional view taken along line V—V of FIG. 4.

The housing 210 is closed off at a first end thereof, and open at an opposite second end thereof. A shaft pin 211 is provided at the first end, and a shaft hole 212 is defined in the second end. Two opposite fixing grooves 213 are defined in an inner circumferential surface of the housing 210 at the shaft hole 212. A container (not labeled) is defined in a middle of the housing 210. The container includes a rotary hole 214 defined in the housing 210 along a rotary axis A2, and a pair of opposite fixing grooves 215 defined in an inner circumferential wall of the housing 210 at the rotary hole 214. Referring also to FIGS. 4 and 5, two circular openings 216, 218 are defined at two opposite ends of the rotary hole 214. A diameter of the opening 218 is less than a diameter of opening 216. A protruding portion 217 is formed on an outer top surface of the housing 210. The housing 210 is rotatably assembled with a body 310 of a foldable mobile phone at the shaft pin 211 and the shaft hole 212. Thus a cover 320 of the mobile phone can rotate with respect to the body 310 about a rotary axis A1.

The spring 220 is placed around the rotary shaft 250 and is received in the container of the housing 210. A first end of the spring 220 is supported by an inner surface of the housing 210, and a second end of the spring 220 is supported by the driven element 230 along axis A2. An outer diameter of the spring 220 is greater than the diameter of the opening 218, in order to prevent the spring 220 from coming out of the housing 210.

The driven element 230 is a hollow cylinder. A first end of the driven element 230 supports the spring 220, and an opposite second end of the driven element 230 contacts the cam 240. Two opposite protuberances 231 are formed on an outer surface of the driven element 230, parallel to axis A2. The protuberances 231 are engagingly received in the fixing grooves 215. The second end of the driven element 230 has a rugged cam surface 232. The cam surface 232 includes two generally opposite valley-shaped portions 233, and two generally opposite mountain-shaped portions 234 between the valley-shaped portions 233, so that a plurality of slanted surfaces 235 is formed between respective valley-shaped portions 233 and mountain-shaped portions 234. The valley-shaped portions 233 and the mountain-shaped portions 234 have flat surfaces. The driven element 230 defines a central longitudinal cavity 236 therein.

Figure 3:
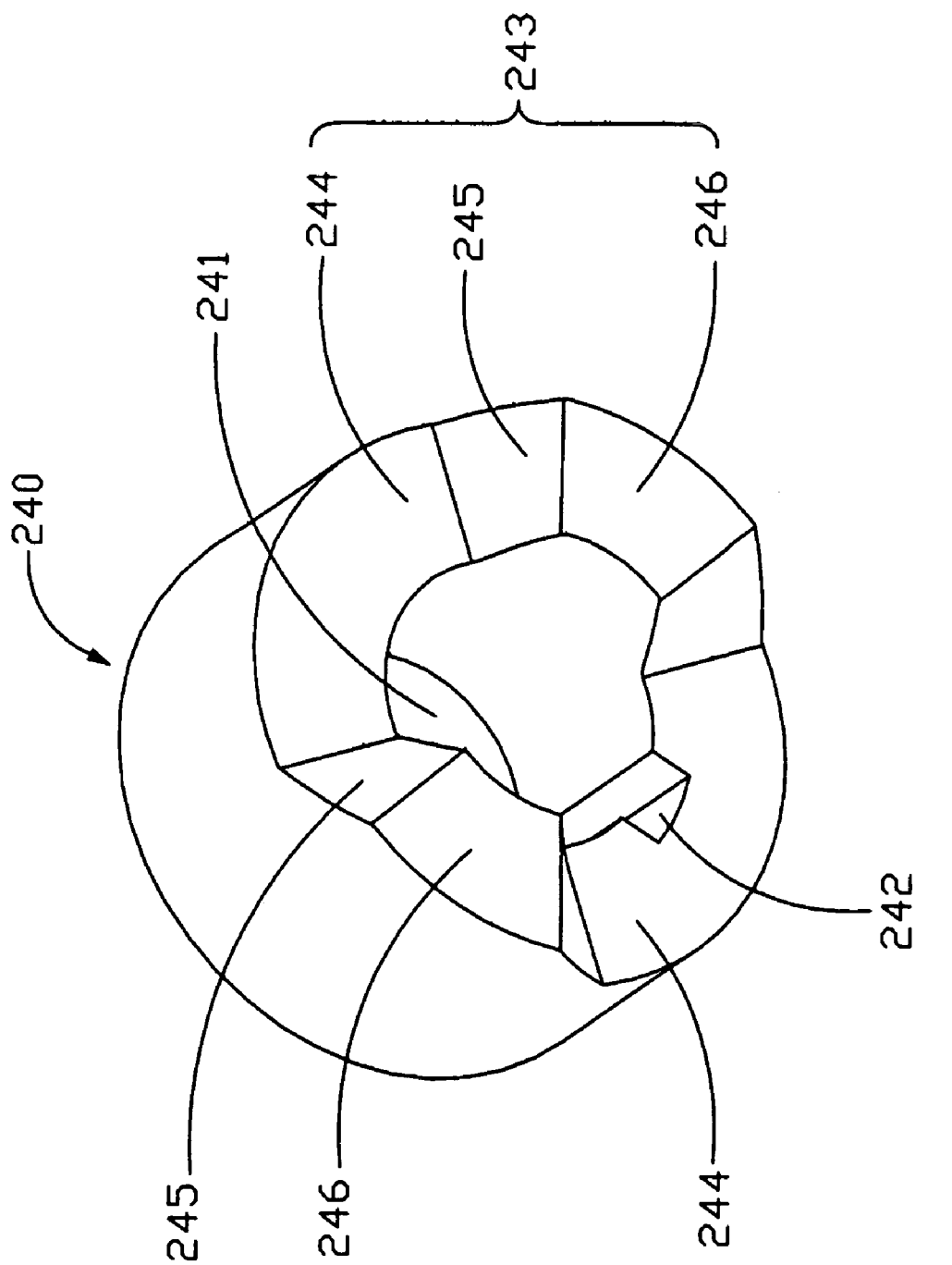
FIG. 3 is an enlarged view of a cam of the rotary hinge assembly of FIG. 1, but viewed from another aspect.

Referring to FIG. 3, the cam 240 is a hollow cylinder, and defines a central longitudinal cam hole 241 therethrough. A groove 242 is longitudinally defined in an inner surface of the cam 240, in communication with the cam hole 241. A first end of the cam 240 has a rugged cam surface 243, which slidably contacts the cam surface 232 of the driven element 230. The cam surface 243 includes two generally opposite mountain-shaped portions 246, and two generally opposite valley-shaped portions 244 between the mountain-shaped portions 246, so that a plurality of slanted portions 245 is formed between respective valley-shaped portions 244 and mountain-shaped portions 246. The mountain-shaped portions 246 and the valley-shaped portions 244 have flat surfaces. Therefore when the cam surface 232 of the driven element 230 rotates with respect to the cam surface 243 of the cam 240, the two cam surfaces 232, 243 can locate steadily in any position in which the mountain-shaped portions 234 abut the mountain-shaped portions 246 so as to form a cam mechanism.

Figure 8:
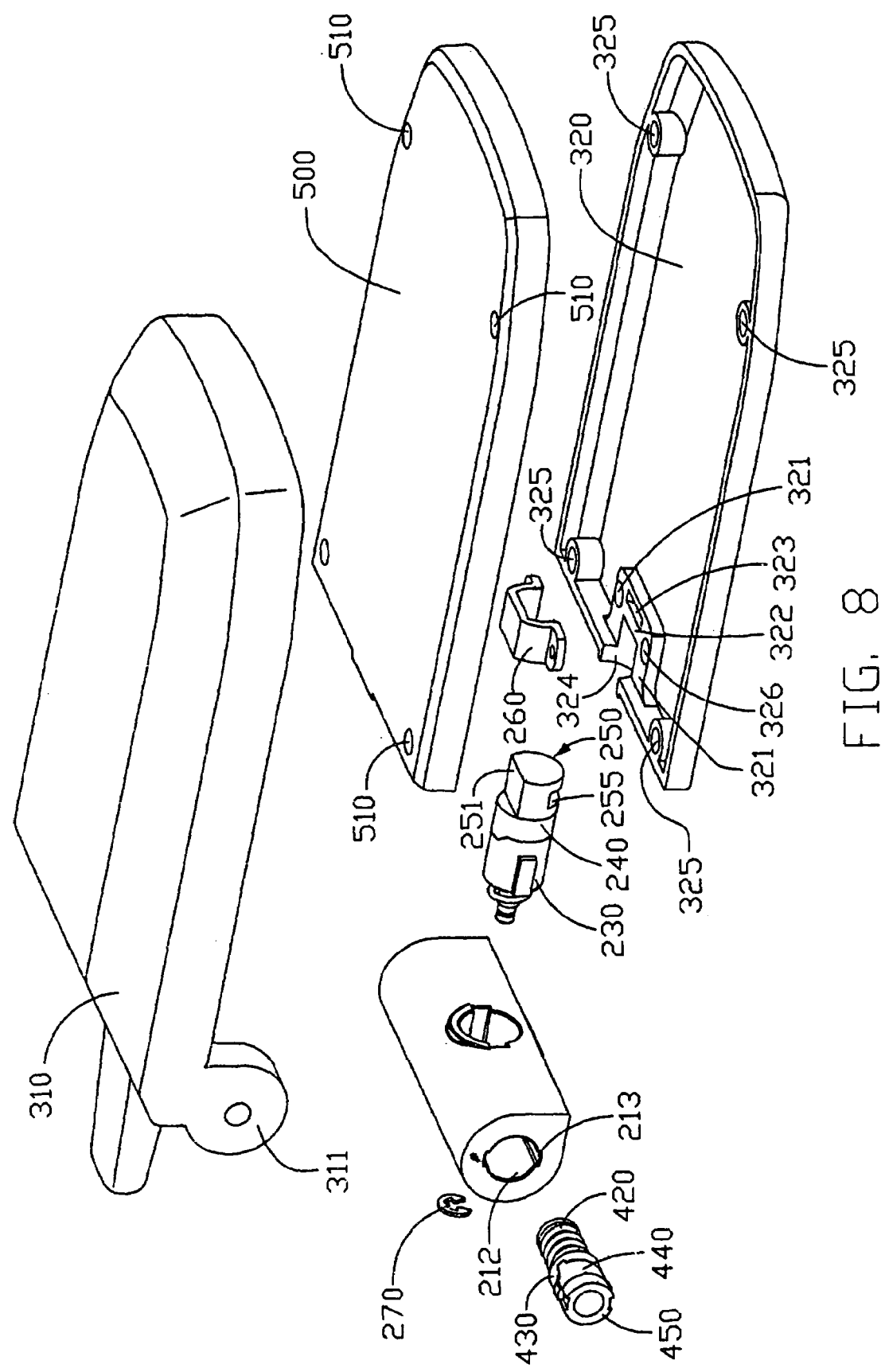
FIG. 8 is an exploded view of the mobile phone of FIG. 4, but showing the mobile phone inverted.
Figure 9:
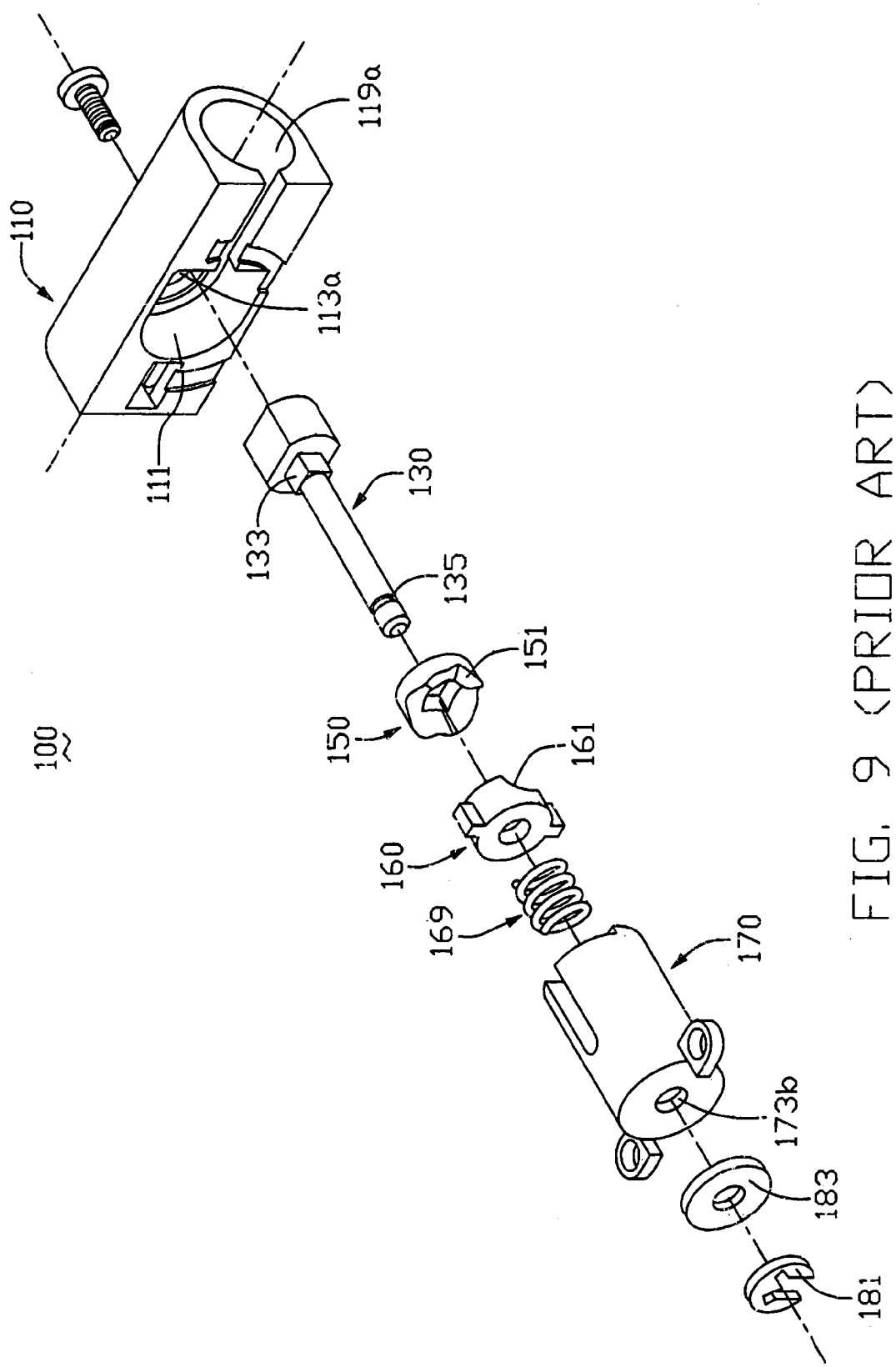
FIG. 9 is an exploded, isometric view of a hinge assembly of the prior art.

The rotary shaft 250 includes a head portion 251, and a medial, coaxial step portion 252 adjacent the head portion 251. A peripheral surface of the head portion 251 includes a flat surface 253 and an arcuate surface 254. A segment-shaped groove 255 is defined at the circular arcuate surface 254, thereby forming an arcuate portion 256 at a first end of the groove 255. Referring also to FIG. 8, the groove 255 engagingly receives a flat board 322 of the cover 320, and the arcuate portion 256 engages in a slot 323 of the flat board 322. A protuberance 257 is longitudinally formed on an outer surface of the step portion 252, for engaging in the groove 242 of the cam 240. An annular groove 258 is defined in a circumferential surface of an end of the rotary shaft 250 opposite from the head portion 251. The rotary shaft 250 is positioned so that the annular groove 258 is located at an outside of the opening 218 of the housing 210. Then the fixing clip 270 is fixed in the groove 258, thereby fixing the rotary shaft 250 in the housing 210 and having the rotary shaft 250 further supported and confined directly by the housing 210.

The anti-pressure board 260 is curved, and includes a central curved portion 261 and two opposite wing portions 262. Two through holes 264 are defined in the wing portions 262 respectively. A U-shaped trough 263 is defined by the curved portion 261 and the wing portions 262, for receiving the head portion 251 of the rotary shaft 250. In particular, an inner surface of the curved portion 261 contacts the flat surface 253 of the head portion 251 of the rotary shaft 250.

In assembly of the rotary hinge assembly 200, the cam 240, the driven element 230 and the spring 220 are assembled with the rotary shaft 250 in that order, and the spring 220 and the driven element 230 are received in the container of the housing 210 in that order. The step portion 252 of the rotary shaft 250 is snugly received in the cam hole 241 of the cam 240, with the protuberance 257 of the step portion 252 engaging in the groove 242 of the cam 240 so that the cam 240 can rotate with the rotary shaft 250. The driven element 230 receives the rotary shaft 250 therethrough, with the cam surface 232 of the driven element 230 slidably contacting the cam surface 243 of the cam 240. The protuberances 231 of the driven element 230 are engaged in the fixing grooves 215 of the housing 210, so that the driven element 230 can only slide along axis A2 and cannot rotate about axis A2. The spring 220 applies elastic force on the driven element 230. Thus when the valley-shaped portions 233 of the driven element 230 are in contact the mountain-shaped portions 246 of the cam 240, the cam 240 is firmly held in position and does not rotate.

Figure 6:
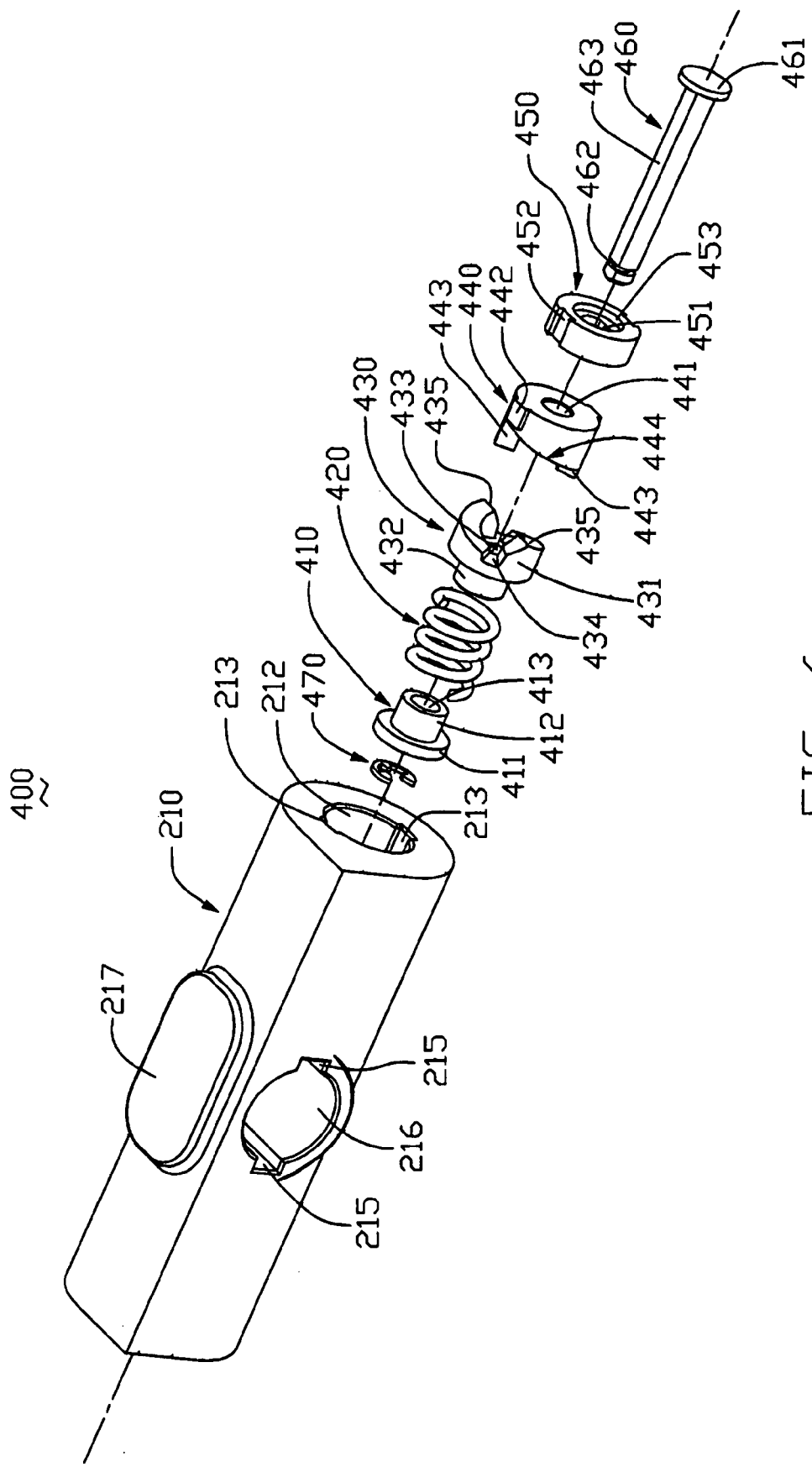
FIG. 6 is an exploded, isometric view of the folder-opening hinge assembly only of the rotary type hinge assembly of FIG. 1.
Figure 7:
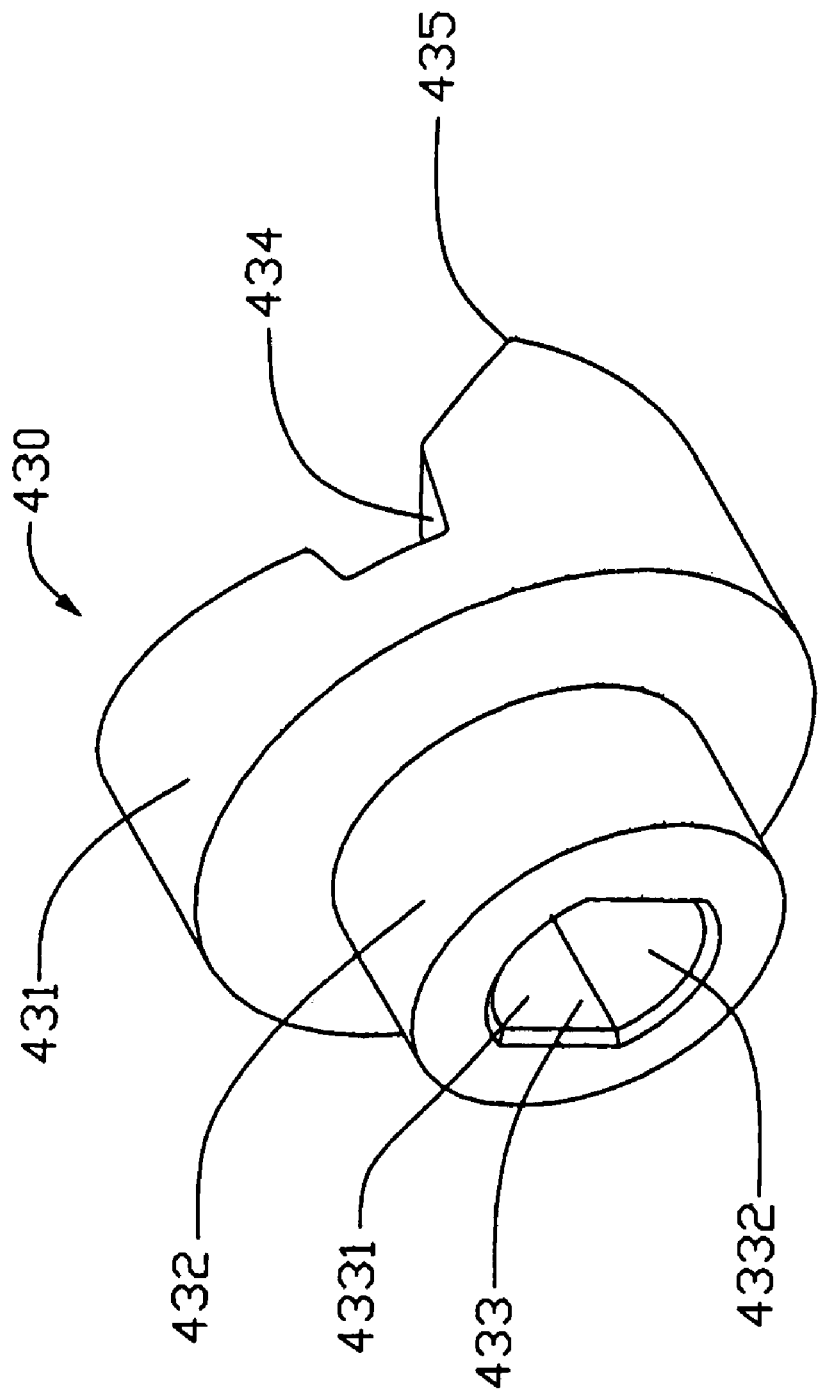
FIG. 7 is an enlarged view of a driven element of the folder-opening hinge assembly of FIG. 6, but viewed from another aspect.

Referring to FIGS. 5, 6 and 7, the folder-opening hinge assembly 400 of the present invention is for opening the cover 320 relative to the body 310. The folder-opening hinge assembly 400 includes a fixing sheath 410, a helical spring 420, a driven element 430, a cam 440, a blocking ring 450, a connecting shaft 460, and an E-shaped fixing clip 470. The fixing clip 470, the fixing sheath 410, the spring 420, and the driven element 430 are received in the shaft hole 212 in that order. The connecting shaft 460 connects the blocking ring 450, the cam 440, the driven element 430, the spring 420, the fixing sheath 410 and the fixing clip 470 together.

The fixing sheath 410 includes a sheath body 412 having a flange 411. An axial cavity 413 is defined through the sheath body 412. An inner diameter of the spring 420 is greater than an outer diameter of the sheath body 412. The spring 420 receives the sheath body 412, with a first end of the spring 420 being supported by the flange 411 and a second end of the spring 420 being supported by the driven element 430. The driven element 430 includes a large cylindrical portion 431 and a coaxial small cylindrical portion 432. A cavity 433 is defined through the cylinder portions 431, 432. An inner surface of the driven element 430 at the cavity 433 has two opposite flat surfaces 4331 and two opposite curved surfaces 4332. A first end of the large cylindrical portion 431 has a cam surface. The cam surface includes two generally opposite valley-shaped portions 434, and two generally opposite mountain-shaped portions 435 adjacent the valley-shaped portions 433. Thus a pair of gently-sloped surfaces is formed between the mountain-shaped portions 435 and respective distal valley-shaped portions 434, and a pair of steeply-sloped surfaces is formed between the mountain-shaped portions 435 and respective proximal valley-shaped portions 434.

The cam 440 is a generally a hollow cylinder. Two opposite protuberances 442 are formed on an outer surface of the cam 440. The protuberances 442 engage in the fixing grooves 213 of the housing 210. A central cavity 441 is defined through the cam 440. The cam 440 includes two opposite mountain-shaped portions 443, and two opposite slanted surfaces 444 between the mountain-shaped portions 443. The mountain-shaped portions 443 engage in the valley-shaped portions 434 of the driven element 430, with the driven element 430 slidably contacting the cam 440. The blocking ring 450 defines a cavity 451 in a main portion thereof. An inner surface of the blocking ring 450 at the cavity 451 has two opposite flat surfaces (not labeled) and two opposite curved surfaces (not labeled). A circular recess 453 is defined in one end of the blocking ring 450, coaxial and in communication with the cavity 451. Two opposite grooves 452 are defined in an outer circumferential surface of the blocking ring 450. The connecting shaft 460 includes a shaft body 463 with two opposite flat surfaces and two opposite curved surfaces, a head 461 formed on a first end of the shaft body 463, and an annular groove 462 defined in an opposite second end of the shaft body 463. The shape of the shaft body 463 enables it to be fittingly received through the cavity 451 of the blocking ring 450 and the cavity 433 of the driven element 430.

In assembly of the folder-opening hinge assembly 400, the connecting shaft 460 is inserted through the cavity 451 of the blocking ring 450, the cavity 441 of the cam 440, the cavity 433 of the driven element 430, the spring 420, and the cavity 413 of the fixing sheath 410 in that order. The head 461 of the connecting shaft 460 is received in the recess 453 of the blocking ring 450. The fixing clip 470 is fixed in the annular groove 462 of the connecting shaft 460. The combined fixing clip 470, fixing sheath 410, spring 420, driven element 430, cam 440, and connecting shaft 460 is received in the shaft hole 212 of the housing 210. The protuberances 442 of the cam 440 engage in the fixing grooves 213 of the housing 210, so that the cam 440 can rotate with the housing 210. The blocking ring 450 is received and fixed in a socket 313 of the body 310, so that the rotary shaft 460 is fixed relative to the body 310. Accordingly, the driven element 430 is also fixed relative to the body 310.

Referring to FIG. 8, the cover 320 includes a fixing protuberance 321 formed at an end thereof. An opening 324 is defined in an end of the fixing protuberance 321, to receive part of the rotary hinge assembly 200 therein. Two fixing holes 326 are defined in two opposite sides of the fixing protuberance 321 respectively. The slot 323 is defined in the fixing protuberance 321, for receiving the arcuate portion 256 of the rotary shaft 250. A flat board 322 is defined between the opening 324 and the slot 323, for being engagingly received in the groove 255 of the rotary shaft 250. Four fixing holes 325 are defined in four corners of the cover 320 respectively. A chassis 500 has a shape corresponding to that of the cover 320. Four through holes 510 are defined in four corners of the chassis 500 respectively, corresponding to the fixing holes 325 of the cover 320. The body 310 has two fixing portions 311 at two opposite sides of a hinging end thereof, for rotatably receiving the housing 210 therebetween. A socket 312 and the socket 313 are defined in inner faces of the fixing portions 311 respectively, for receiving the shaft pin 211 and the blocking ring 450 respectively. The socket 313 has a pair of opposite protuberances (not shown).

In assembly of the rotary type hinge assembly 200 to the mobile phone, the blocking ring 450 is engaged in the socket 313 of the body 310, with the grooves 452 engagingly receiving the protuberances of the socket 313. The shaft pin 211 of the housing 210 is rotatably engaged in the socket 312 of the body 310. The housing 210 is thus rotatably connected with the body 310, with the housing 210 rotatable with respect to the body 310 about axis A1. The rotary shaft 250 is placed on the flat board 322 of the cover 320, with the groove 255 engagingly receiving the flat board 322, and the arcuate portion 256 engaging in the slot 323 of the flat board 322. The anti-pressure board 260 is placed on the head portion 251 of the rotary shaft 250, and the through holes 264 of the anti-pressure board 260 are aligned with the fixing holes 326 of the flat board 322. A pair of fasteners (not shown) is inserted through the through holes 264 and engaged in the fixing holes 326. The anti-pressure board 260, the rotary hinge assembly 200 and the cover 320 are thereby attached together, with the rotary shaft 250 rotatable together with the cover 320. The chassis 500 is attached to the cover 320, with four fasteners (not shown) being inserted through the through holes 510 and engaged in the fixing holes 325. When the cover 320 is opened or closed relative to the body 310, the chassis 500 shares part of the rotary force acting on the cover 320. This prevents the rotary force from concentrating on the rotary shaft 250 and the anti-pressure board 260 excessively, and helps prevent the cover 320 and the anti-pressure board 260 from being damaged or destroyed.

In operation of the rotary hinge assembly 200, the cam 240 can be rotated relative to the housing 210 by manually applying force to the cover 320. The mountain-shaped portions 246 of the cam 240 ride along the corresponding slanted surfaces 235, thereby further compressing the spring 220. When the mountain-shaped portions 246 of the cam 240 come into contact with the mountain-shaped portions 234 of the driven element 230, the spring 220 is compressed a maximum amount. Because the mountain-shaped portions 246, 234 both have flat surfaces, the cam 240 can be located to any position relative to the driven element 230 and be held in that position by compression force of the spring 220, as long as the mountain-shaped portions 246 remain in contact with the mountain-shaped portions 234. Thus the cover 320 can be manually rotated to any of a variety of different positions and be securely held thereat by the compression force of the spring 220.

In operation of the folder-opening hinge assembly 400, when the cover 320 is in a closed position with respect to the body 310, the mountain-shaped portions 443 of the cam 440 are in tight contact with the valley-shaped portions 434 of the driven element 430 by reason of elastic force exerted by the spring 420, and the mountain-shaped portions 435 of the driven element 430 are in contact with ends of the slanted surfaces 444 of the cam 440. At this time, the spring 420 is in a least compressed state. When the cover 320 is opened, it is first manually rotated in a first direction. The cam 440 rotates along with the cover 320, whereas the driven element 430 remains fixed because of the shaft body 463 of the connecting shaft 460 being engaged in the cavity 433 of the driven element 430. The mountain-shaped portions 443 of the cam 440 ride out of the valley-shaped portions 434 onto the gently-sloped surfaces of the driven element 430, and ride along the gently-sloped surfaces of the driven element 430. In this process, the driven element 430 is driven further inside the housing 210 along axis A1, and the spring 420 is further compressed and accumulates elastic potential energy. Once the mountain-shaped portions 443 of the cam 440 have ridden over peaks of the mountain-shaped portions 435 of the driven element 430, the manual force can be removed. The spring 420 instantaneously decompresses and drives the driven element 430 to slide along axis A1 toward an outside of the housing 210. This causes the mountain-shaped portions 443 of the cam 440 to slide from the mountain-shaped portions 435 along the steeply-sloped surfaces of the driven element 430 toward corresponding valley-shaped portions 434. In this process, the cam 440 continues to rotate in the first direction, with the cover 320 moving together with the cam 440. Finally, the mountain-shaped portions 443 of the cam 440 slidingly engage in the corresponding valley-shaped portions 434 of the driven element 430. At this time, the cover 320 is securely held in an open position.

When the cover 320 is closed, it is manually rotated in a second direction, the second direction being opposite to the first direction. The cam 440 rotates along with the cover 320, whereas the driven element 430 remains fixed because of the shaft body 463 of the connecting shaft 460 being engaged in the cavity 433 of the driven element 430. The mountain-shaped portions 443 of the cam 440 ride along the steeply-sloped surfaces of the driven element 430 toward the mountain-shaped portions 435. In this process, the driven element 430 is gradually driven further inside the housing 210 along axis A1, and the spring 420 is further compressed and accumulates elastic potential energy. Once the mountain-shaped portions 443 of the cam 440 have ridden over the peaks of the mountain-shaped portions 435 of the driven element 430, the manual force can be removed. The spring 420 instantaneously decompresses and drives the driven element 430 along axis A1 toward the outside of the housing 210. This causes the mountain-shaped portions 443 of the cam 440 to progressively slide along the gently-sloped surfaces of the driven element 430 in the second direction, with the cover 320 moving together with the cam 440. Finally, the mountain-shaped portions 443 of the cam 440 slidingly engage in corresponding valley-shaped portions 434 of the driven element 430. At this time, the cover 320 is securely held in the closed position once again.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A rotary type hinge assembly for joining a body and a cover of a foldable electronic device, the hinge assembly defining a first axis and a second axis perpendicular to the first axis, the hinge assembly enabling the cover to open with respect to the body about the first axis and rotate about the second axis, and the hinge assembly comprising:
a housing rotatably attached to the body of the foldable electronic device, and defining a container therein;
a first elastic means received in the container of the housing;
a first driven element, a first end thereof supporting the first elastic means, and a second end thereof having a cam surface;
a first cam being coaxial with the first driven element, and having a cam surface defined on an end thereof, the cam surface comprising a mountain-shaped portion having a flat surface engaging with the cam surface of the first driven element;

a rotary shaft including a head portion at an end thereof; and a fixing means comprising an anti-pressure board for fixing the head portion of the rotary shaft in the cover; wherein the rotary shaft extends through the first cam, the first driven element and the first elastic means in that order, and is rotatably attached to the housing, the anti-pressure board is curved and comprises a curved portion and two wing portions, the curved portion and the wing portions define a U-shaped trough receiving the head portion of the rotary shaft, and a pair of through holes is defined in the wing portions.

2. The rotary type hinge assembly as claimed in claim 1, wherein the container comprises a rotary hole defined in the housing along the second axis, and a pair of fixing grooves defined in an inner circumferential wall of the housing at the rotary hole.

3. The rotary type hinge assembly as claimed in claim 2, wherein the first driven element is a hollow cylinder which defines a central longitudinal cavity therein, two opposite protuberances are formed on an outer surface of the first driven element parallel to the second axis, and the protuberances are engagingly received in the fixing grooves of the housing.

4. The rotary type hinge assembly as claimed in claim 1, wherein the first cam is a hollow cylinder which defines a longitudinal cam hole therethrough, and an inner surface of the first cam defines a longitudinal groove in communication with the cam hole.

5. The rotary type hinge assembly as claimed in claim 4, wherein the rotary shaft comprises a step portion adjacent to the head portion, a protuberance is longitudinally formed on an outer surface of the step portion, the protuberance engaging in the groove of the first cam.

6. The rotary type hinge assembly as claimed in claim 1, further comprising a first fixing clip, and wherein an end of the rotary shaft opposite from the head portion defines a groove, the groove of the rotary shaft is located outside an opening of the housing, and the first fixing clip is fixed in the groove of the rotary shaft.

7. The rotary type hinge assembly as claimed in claim 1, wherein the cam surface of the first driven element comprises two generally opposite mountain-shaped portions, and two generally opposite valley-shaped portions between the mountain-shaped portions, the valley-shaped portions each having a flat surface.

8. The rotary type hinge assembly as claimed in claim 1, wherein the cam surface of the first cam comprises two generally opposite valley-shaped portions between the mountain-shaped portions, the valley-shaped portions each having a flat surface.

9. The rotary type hinge assembly as claimed in claim 1, wherein the head portion of the rotary shaft comprises an arcuate surface, and the head portion defines a segment-shaped groove at the arcuate surface, thereby forming an arcuate portion at an end of the segment-shaped groove.

10. A rotary type hinge assembly for joining a body and a cover of a foldable electronic device, the hinge assembly defining a first axis and a second axis perpendicular to the first axis, the hinge assembly enabling the cover to open with respect to the body about the first axis and rotate about the second axis, and the hinge assembly comprising:

a housing rotatably attached to the body of the foldable electronic device, and defining a container therein;

a first elastic means received in the container of the housing;

a first driven element, a first end thereof supporting the first elastic means, and a second end thereof having a cam surface;

a first cam being coaxial with the first driven element, and having a cam surface defined on an end thereof, the cam surface comprising a mountain-shaped portion having a flat surface engaging with the cam surface of the first driven element;

a rotary shaft;

a fixing means for fixing the rotary shaft in the cover; and a folder-opening hinge assembly;

wherein the rotary shaft extends through the first cam, the first driven element and the first elastic means in that order, and is rotatably attached to the housing, the housing defines a shaft bole in an end thereof, and the folder-opening hinge assembly is attached in the shaft hole to enable the cover to rotate about the first axis, the folder-opening hinge assembly comprises a fixing sheath, a second elastic means, a second driven element, a second cam, a blocking ring, a connecting shaft and a second fixing clip, the connecting shaft extends through the fixing sheath, the second elastic means, the second driven element, the second cam and the blocking ring in that order, and the second fixing clip fixes the fixing sheath, second elastic means, second driven element, second cam, blocking ring, and connecting shaft together.

11. The rotary type hinge assembly as claimed in claim 10, wherein the fixing sheath comprises a sheath body having a flange, and the sheath body defines a cavity therethrough.

12. The rotary type hinge assembly as claimed in claim 11, wherein the second elastic means is a helical spring, and the spring receives the sheath body, with a first end of the spring being supported by the flange, and a second end of the spring being supported by the second driven element.

13. The rotary type hinge assembly as claimed in claim 10, wherein the second driven element comprises a small cylindrical portion and a coaxial large cylindrical portion, the cylindrical portions define a cavity therethrough, an inner surface of the second driven element at the cavity has two opposite flat surfaces and two opposite curved surfaces, and a cam surface is defined at an end of the large cylindrical portion.

14. The rotary type hinge assembly as claimed in claim 13, wherein the second cam is a hollow cylinder, two protuberances are provided on an outer surface of the second cam, an inner surface of the housing at the shaft hole defines two fixing grooves, the protuberances are engagingly received in the fixing grooves at the shaft hole, and the second cam slidably contacts the second driven element.

15. The rotary type hinge assembly as claimed in claim 14, wherein the second cam comprises two mountain-shaped portions, which are movably engaged with the cam surface of the second driven element.

16. The rotary type hinge assembly as claimed in claim 15, wherein the blocking ring defines a cavity in a main portion thereof and an inner surface of the blocking ring at the cavity has two opposite flat surfaces and two opposite curved surfaces.

17. The rotary type hinge assembly as claimed in claim 16, wherein the connecting shaft comprises a shaft body with two opposite flat surfaces and two opposite curved surfaces, and a head on a first end of the shaft body, and the shaft body is received through the cavities of the second driven element and the blocking ring, such that the shaft body cannot rotate relative to the second driven element and the blocking ring.

18. The rotary type hinge assembly as claimed in claim 17, wherein a second end of the shaft body defines a groove, and the second fixing clip is fixed in the groove of the shaft body.

19. A hinge assembly for rotatably connecting a body and a cover of a foldable electronic device about a first axis, comprising:
- a housing rotatably attached to said body of said foldable electronic device along said first axis, said housing defining a rotary hole along a second axis;
- a cam mechanism received in said rotary hole and extending along said second axis, operation of said cam mechanism controlling rotation of said cover about said second axis, said cam mechanism comprises a driven element fixed in said housing, and a cam with a cam surface fixed to said shaft, and said cam surface comprises a flat mountain-shaped portion to engage with said driven element;
- an elastic means received in said rotary hole of said housing with one end thereof abutting against said housing and another end thereof abutting against said cam mechanism to facilitate said operation of said cam mechanism; and
- a rotary shaft extending in said rotary hole of said housing along said second axis and supportably confined by said housing at a first end thereof a second opposite end of said rotary shaft fixed to said cover of said foldable electronic device so as to be rotatable with said cover about said second axis;
- wherein said rotary shaft comprises a head portion at said second end thereof, and said head portion comprises an arcuate surface with a segment-shaped groove defined thereat.

* * * * *